(12) United States Patent
Horiguchi

(10) Patent No.: US 10,218,872 B2
(45) Date of Patent: Feb. 26, 2019

(54) DOCUMENT READING DEVICE CAPABLE OF DOCUMENT READING BY BOTH METHODS OF FIXED DOCUMENT READING AND CONVEYED DOCUMENT READING WHICH PERFORMS BLACK REFERENCE CORRECTION AND IMAGE FORMING APPARATUS PROVIDED WITH SAME

(71) Applicant: KYOCERA Document Solutions Inc., Osaka (JP)

(72) Inventor: Yasuyuki Horiguchi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/894,232

(22) PCT Filed: Jun. 4, 2014

(86) PCT No.: PCT/JP2014/064848
§ 371 (c)(1),
(2) Date: Nov. 25, 2015

(87) PCT Pub. No.: WO2014/196568
PCT Pub. Date: Dec. 11, 2014

(65) Prior Publication Data
US 2016/0134777 A1 May 12, 2016

(30) Foreign Application Priority Data
Jun. 5, 2013 (JP) ................................. 2013-119335

(51) Int. Cl.
*H04N 1/407* (2006.01)
*H04N 1/00* (2006.01)
(Continued)

(52) U.S. Cl.
CPC ........... *H04N 1/125* (2013.01); *H04N 1/0057* (2013.01); *H04N 1/00795* (2013.01);
(Continued)

(58) Field of Classification Search
CPC . H04N 1/125; H04N 1/4076; H04N 2201/044
See application file for complete search history.

(56) References Cited

U.S. PATENT DOCUMENTS 7,251,063 B2 7/2007 Mui et al.
8,054,511 B2 11/2011 Aoki et al.
(Continued)

FOREIGN PATENT DOCUMENTS

JP   2002-271576 A   9/2002
JP   2009-060219 A   3/2009
(Continued)

OTHER PUBLICATIONS

International Search Report dated Sep. 9, 2014 issued for corresponding PCT/JP2014/064848 application (pp. 1-3).
(Continued)

*Primary Examiner* — Peter K Huntsinger
(74) *Attorney, Agent, or Firm* — IP Business Solutions, LLC

(57) ABSTRACT

A document reading device (20) includes: a document conveyance section (6) and a document reading device (5). A conveyed document reading region (161*b*) has: a document discharge guide (51) arranged downstream of an image reading position (163*a*) in a document conveyance direction; and a transparent reading sheet (52) provided along a surface of the contact glass (161) and a surface of the document discharge guide (51), the document conveyance section (6) has a reading guide (62) forming a document conveyance path oppositely to the conveyed document reading region (161*b*), and the reading guide (62) has, on part of a surface opposing the conveyed document reading region (161*b*), a black reference member (620) optically read by an image reading section (163) for the purpose of correcting black reference data of an image of the document conveyed by the
(Continued)

document conveyance section (6) and read by the document reading device (5).

4 Claims, 5 Drawing Sheets

(51) Int. Cl.
    *H04N 1/10*     (2006.01)
    *H04N 1/12*     (2006.01)
    *H04N 1/193*     (2006.01)

(52) U.S. Cl.
    CPC ........... *H04N 1/123* (2013.01); *H04N 1/1235* (2013.01); *H04N 1/193* (2013.01); *H04N 1/4076* (2013.01); *H04N 1/1017* (2013.01); *H04N 2201/0081* (2013.01); *H04N 2201/0094* (2013.01)

(56) References Cited

U.S. PATENT DOCUMENTS

| | | |
|---|---|---|
| 8,305,652 B2 | 11/2012 | Honda et al. |
| 8,953,185 B2 | 2/2015 | Horiguchi |
| 2003/0099000 A1* | 5/2003 | Hiromatsu ........... H04N 1/4076 358/461 |
| 2004/0004320 A1* | 1/2004 | Watanabe ................ B65H 5/38 271/10.01 |
| 2004/0109207 A1 | 6/2004 | Mui et al. |
| 2007/0145662 A1* | 6/2007 | Yamada ................ H04N 1/121 271/3.2 |
| 2008/0204824 A1* | 8/2008 | Tokida ............... H04N 1/40056 358/496 |
| 2009/0059319 A1 | 3/2009 | Aoki et al. |
| 2010/0073737 A1 | 3/2010 | Honda et al. |
| 2010/0142009 A1* | 6/2010 | Tsukahara ........... H04N 1/4072 358/475 |
| 2013/0135645 A1 | 5/2013 | Horiguchi |

FOREIGN PATENT DOCUMENTS

| | | |
|---|---|---|
| JP | 2010-041481 A | 2/2010 |
| JP | 2012-124562 A | 6/2012 |
| JP | 2013-115711 A | 6/2013 |

OTHER PUBLICATIONS

Extended European Search Report mailed by European Patent Office dated Feb. 22, 2017 in the corresponding European Patent Application No. 14807933.8.

\* cited by examiner

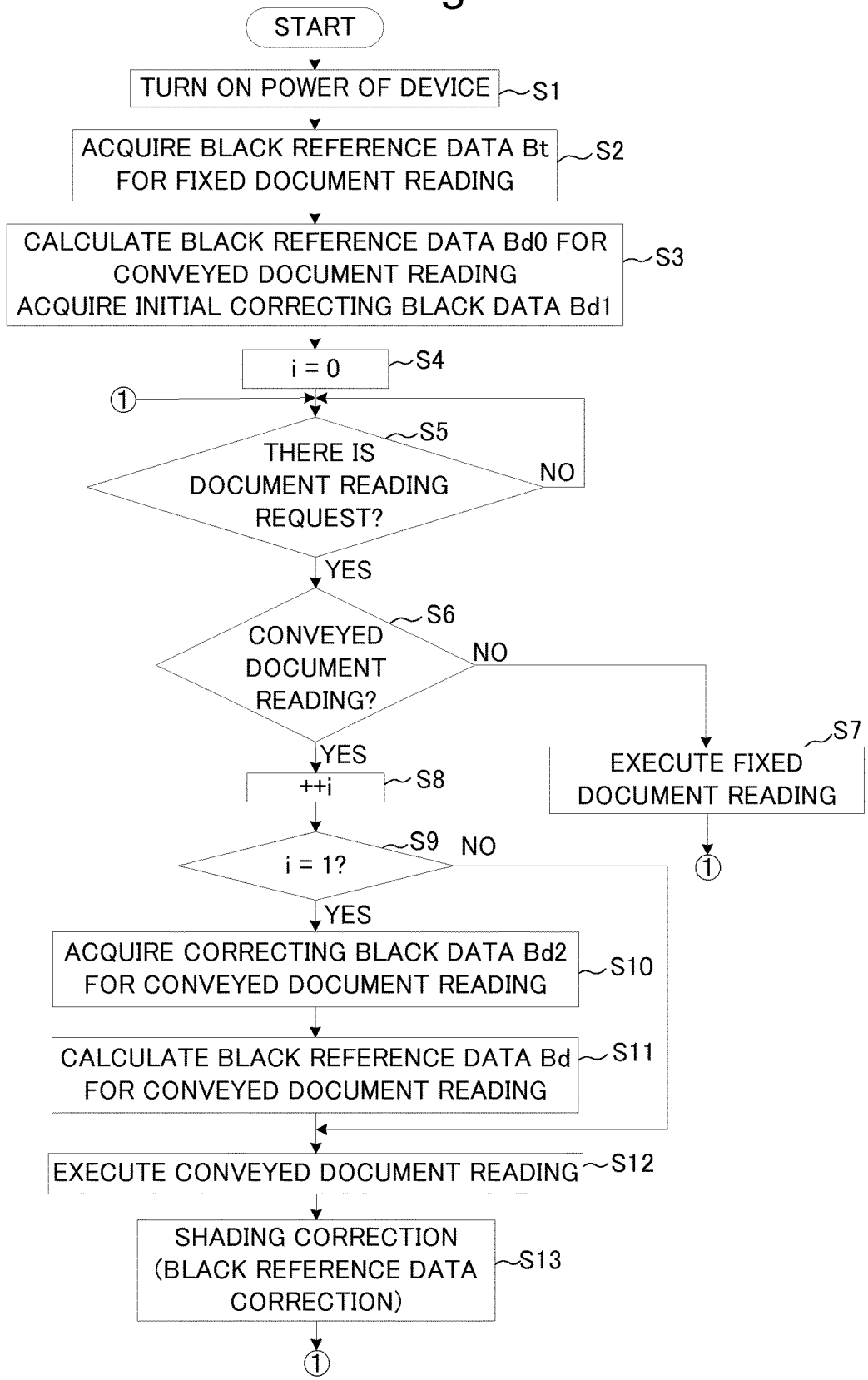

DOCUMENT READING DEVICE CAPABLE OF DOCUMENT READING BY BOTH METHODS OF FIXED DOCUMENT READING AND CONVEYED DOCUMENT READING WHICH PERFORMS BLACK REFERENCE CORRECTION AND IMAGE FORMING APPARATUS PROVIDED WITH SAME

TECHNICAL FIELD

The present invention relates to a document reading device and an image forming apparatus, and more specifically to a technology of favorably keeping concentration of an image of a document automatically conveyed and read in the document reading device.

BACKGROUND ART

As a reading method of an image forming apparatus, there are two methods including fixed document reading and conveyed document reading. The fixed document reading is a method of loading a document on a contact glass, pressing the document against the contact glass with, for example, a platen mat or a document conveyance device, and reading the document by an image reading section. The conveyed document reading is a method of stopping the image reading section at a predetermined position and reading, with the image reading section, the document conveyed to this position.

In the conveyed document reading method, in a case where a contact glass for the fixed document reading and a contact glass for the conveyed document reading are provided separately, a typical configuration is provided such that a document discharge guide is put in below the contact glass for the conveyed document reading. Moreover, configuration such that one piece of contact glass is provided includes a configuration such that a transparent reading sheet is provided on a surface of the contact glass, image reading is performed through the transparent reading sheet, and part of the transparent reading sheet is loaded on a document discharge guide and such that document discharge is enabled or a configuration such that the transparent reading sheet is attached to the document reading device to permit document conveyance.

The transparent reading sheet is used to form a contact glass for the fixed document reading and the conveyed document reading with one piece for downsizing the device and reducing cost, and is used to read and discharge the document at time of the conveyed document reading. With such configuration, the document is read through the contact glass only in the fixed document reading while the document is read through the contact glass and the transparent reading sheet in the conveyed document reading, and thus image concentration varies depending on the reading method. In Patent Literature 1 described below, in order to match the image concentrations, in both the fixed document reading and the conveyed document reading, a reference document is read and a concentration difference is corrected.

CONVENTIONAL ART LITERATURES

Patent Literature 1: Japanese Patent Application Laid-open No. 2012-124560

SUMMARY OF THE INVENTION

With the configuration such that the document is read through the contact glass and the transparent reading sheet at time of the conveyed document reading, a small scratch is formed on a surface of the transparent reading sheet as a result of document passage. A small scratch increases as a result of repeated document passage. With this scratch, especially in a case where a document with high concentration (closer to black), irradiated light, which is originally absorbed to the document, is reflected on the scratch on the transparent reading sheet and a high concentration part of the document is read as a thin (bright) image.

With the concentration correction method of Patent Literature 1 described above, initial concentrations in the fixed document reading and the conveyed document reading can be matched, but in continuous use of the device, the change in the image concentration in the conveyed document reading cannot be corrected.

The present invention has been made to solve the problem described above, and it is an object of the invention to, in an image forming apparatus that performs document reading through a transparent reading sheet at time of conveyed document reading, favorably keep image concentration even in a case where a small scratch is formed on a surface of the transparent reading sheet as a result of, for example, document passage.

A document reading device according to one aspect of the invention includes: a document conveyance section individually conveying loaded documents; an image reading section moving in a predefined direction at below a fixed document reading region so as to read an image of the document loaded in a fixed document reading region, the fixed document reading region being one portion of a contact glass, and stopping at a reading position lower than a conveyed document reading region so as to read an image of the document conveyed by the document conveyance section to the conveyed document reading region, the conveyed document reading region being another portion of the contact glass; a document installation guide guiding the document conveyed by the document conveyance section to an area between the conveyed document reading region and a platen member provided above the conveyed document reading region; a document discharge guide being arranged downstream, in a document conveyance direction, of the reading position where the document guided by the document installation guide is read by the image reading section in the conveyed document reading region, the document discharge guide guiding the document in a direction separating the document from a portion of the contact glass as the conveyed document reading region; a transparent reading sheet being provided in a manner such as to link between a surface of the portion of the contact glass as the conveyed document reading region and a surface of the document discharge guide; a black reference member of a black color extending in a main-scanning direction of the image reading section at part of a surface of the platen member opposing the conveyed document reading region; and a black reference correction section, by using correcting black data obtained through reading of the black reference member plate by the image reading section via the transparent reading sheet, correcting black reference data used for shading of the document image acquired through the reading by the image reading section in the conveyed document reading region.

An image forming apparatus according to another aspect of the invention includes: the document reading device; an image processing section, by using the black reference data corrected by the black reference correction section, performing shading correction on the document image acquired by the image reading section in the conveyed document reading region part; an image formation section forming a toner image on recording paper based on the image subjected to the shading correction performed by the image processing section; and a fixing section fixing the toner image onto the recording paper through thermal compression.

EFFECTS OF THE INVENTION

With the document reading device and the image forming apparatus according to one aspect of the invention, at time of the conveyed document reading, even in a case where a small scratch is formed on the surface of the transparent reading sheet as a result of the document passage, the image concentration can be favorably kept.

BRIEF DESCRIPTION OF THE DRAWINGS

FIG. 5 is a flowchart of black reference data correction in document reading.

MODES FOR CARRYING OUT THE INVENTION

Figure 1:
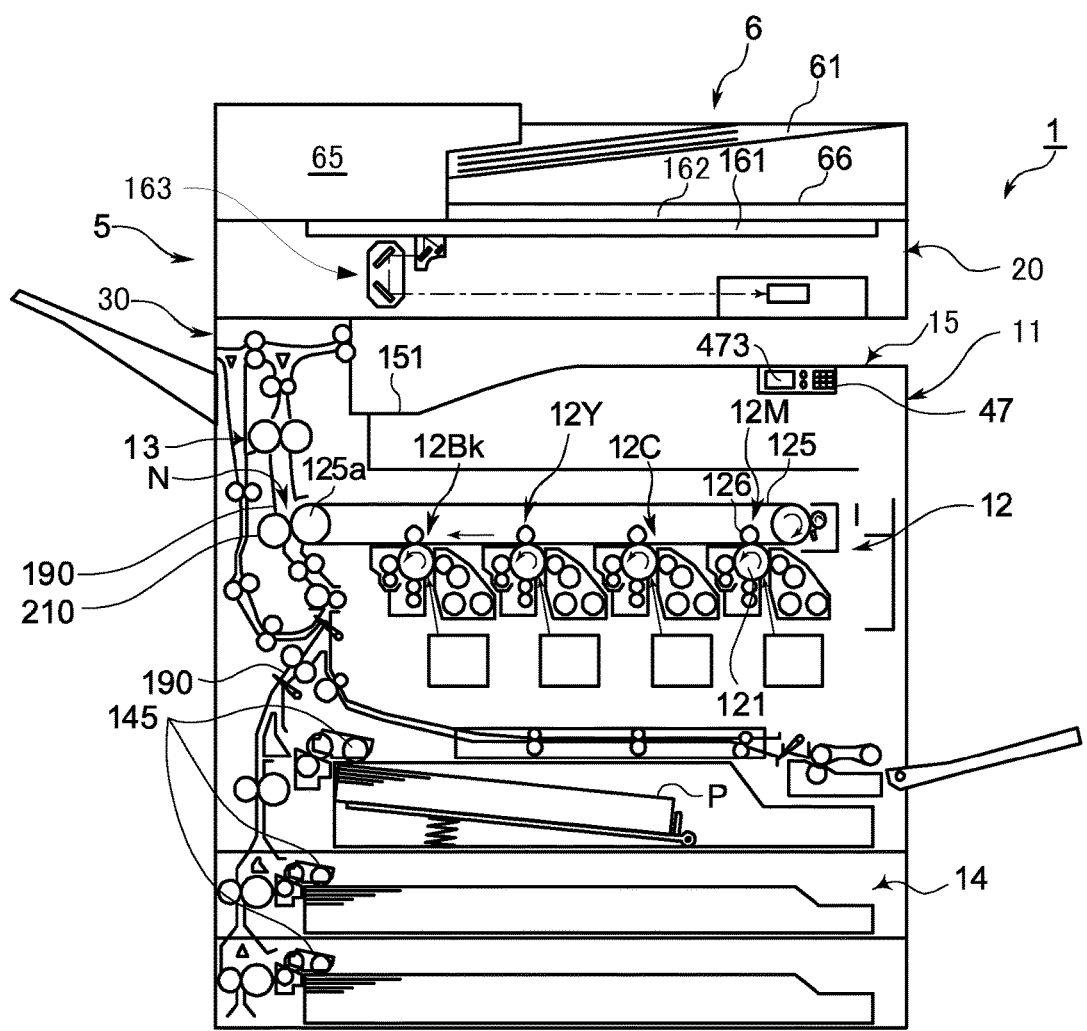
FIG. 1 is an elevation sectional view showing a structure of an image forming apparatus according to one embodiment of the present invention.

Hereinafter, an image forming apparatus according to one embodiment of the present invention will be described with reference to the drawings. FIG. 1 is an elevation sectional view showing a structure of the image forming apparatus according to one embodiment of the invention. The image forming apparatus 1 is a multifunction peripheral combining a plurality of functions including, for example, a copy function, a printer function, a scanner function, and a facsimile function.

The image forming apparatus 1 is schematically composed of: an apparatus body 11; a document reading device 20 arranged above the apparatus body 11 oppositely thereto; and a coupling section 30 provided between the document reading device 20 and the apparatus body 11. The coupling section 30 is a construction for coupling the apparatus body 11 and the document reading device 20 to each other while forming a paper discharge section 15 therebetween, is vertically provided from a left part and a rear part of the apparatus body 11 in FIG. 1, and is L-shaped in a plan view.

The document reading device 20 is supported at a top end part of the coupling section 30. The document reading device 20 includes: a document reading device 5 and a document conveyance section 6.

The document reading device 5 includes a contact glass 161 which is fitted to an opening on a top surface of an image reading section housing and which is provided for document loading. As described later on, the contact glass 161 has: a fixed document reading region where the loaded document is read; and a conveyed document reading region where the document conveyed by the document conveyance section 6 is read. The document reading section 5 further includes: a document press cover 162 pressing the document loaded on the contact glass 161 in an openable and closable manner; and an image reading section 163 which reads an image of each of the document loaded in the fixed document reading region of the contact glass 161 and the document conveyed to the conveyed document reading region of the contact glass 161. The image reading section 163 uses an image sensor such as a charge coupled device (CCD) or a complementary metal oxide semiconductor (CMOS) to optically read the image of the document and generate image data.

The document conveyance section 6 includes: a document loading stand 61 where a document is loaded; a document discharge section 66 to which the document already subjected to image reading is discharged; and a document conveyance mechanism 65. The document conveyance mechanism 65 includes: a paper feed roller, a conveyance roller, and a paper inversion mechanism, all not shown. The document conveyance mechanism 65, as a result of driving of the paper feed roller and the conveyance roller, individually feeds documents loaded on the document loading stand 61 and transports it to the conveyed document reading region of the contact glass 161 to enable reading by the image reading section 163, and then discharges it to the document discharge section 66. Moreover, as a result of inverting the document by the paper inversion mechanism and conveying it again to the conveyed document reading region of the contact glass 161, the document conveyance mechanism 65 makes it possible for the image reading section 163 to read images on both surfaces of the document.

Further, the document conveyance section 6 is provided rotationally with respect to the document reading device 5 in a manner such that a front side of the document conveyance section 6 is upwardly movable. Moving the front side of the document conveyance section 6 upward to open a top surface of the contact glass 161 as a document stand permits the user to load, on the top surface of the contact glass 161, a document to be read, for example, two facing pages of a book.

The apparatus body 11 includes: an image formation section 12, a fixing section 13, a paper feed section 14, a paper discharge section 15, an operation section 47; etc.

The operation section 47 receives, from an operator for various kinds of operation and processing executable by the image forming apparatus 1, an image formation operation execution instruction, a document reading operation execution instruction, etc. The operation section 47 includes a display section 473 which displays an operation guide, etc. for the user.

To perform the document reading operation by the image forming apparatus 1, an image of the document conveyed by the document conveyance section 6 or the document loaded on the contact glass 161 is optically read by the document reading device 5 to generate image data. The image data generated by the document reading section 5 is saved into, for example, a built-in HDD or a network-connected computer.

To perform the image formation operation by the image forming apparatus 1, based on, for example, the image data generated through the document reading operation described above, image data received from a user's terminal device such as the network-connected computer or a smart phone, or the image data stored in the built-in HDD, the image formation section 12 forms a toner image on recording paper P as a recording medium fed from the paper feed section 14. The image formation units 12M, 12C, 12Y, and 12Bk of the image formation section 12 each include: a photoconductive drum; a developing device which supplies a toner to the photoconductive drum; a toner cartridge (not shown) which stores the toner; a charging device; an exposure device; and a primary transfer roller 126.

To perform color printing, the magenta image formation unit 12M, the cyan image formation unit 12C, the yellow image formation unit 12Y, and the black image formation unit 12Bk of the image formation section 12, based on images composed of respective color components forming the image data, respectively form the toner images on the photoconductive drums 121 through charging, exposure, and developing processes and transfer the toner images by the primary transfer roller 126 onto an intermediate transfer belt 125 stretched between a driving roller 125a and a driven roller 125b.

The intermediate transfer belt 125 has on its outer circumferential surface an image carrying surface where the toner images are transferred, and is driven by the driving roller 125a while being in contact with circumferential surfaces of the photoconductive drums 121. The intermediate transfer belt 125 endlessly runs between the driving roller 125a and the driven roller 125b while synchronizing with each photoconductive drum 121.

The toner images of the respective colors transferred onto the intermediate transfer belt 125 are superposed on each other on the intermediate transfer belt 125 through transfer timing adjustment, turning into a color toner image. A secondary transfer roller 210 transfers, at a nip part N formed with the driving roller 125a with the intermediate transfer belt 125 in between, the color toner image, which has been formed on a surface of the intermediate transfer belt 125, onto recording paper P conveyed through a conveyance path 190 from the image formation section 12. Then the fixing section 13 fixes the toner image on the recording paper P onto the recording paper P through thermal compression. The recording paper P on which the color toner image has already been formed and which has been subjected to the fixing processing is discharged onto a discharge tray 151.

The paper feed section 14 includes a plurality of paper feed cassettes. A control section (not shown) drives, into rotation, a pickup roller 145 of the paper feed cassette storing the recording paper of a size specified by an operator's instruction, and transports the recording paper P stored in the respective paper feed cassette towards the nip part N.

Figure 2:
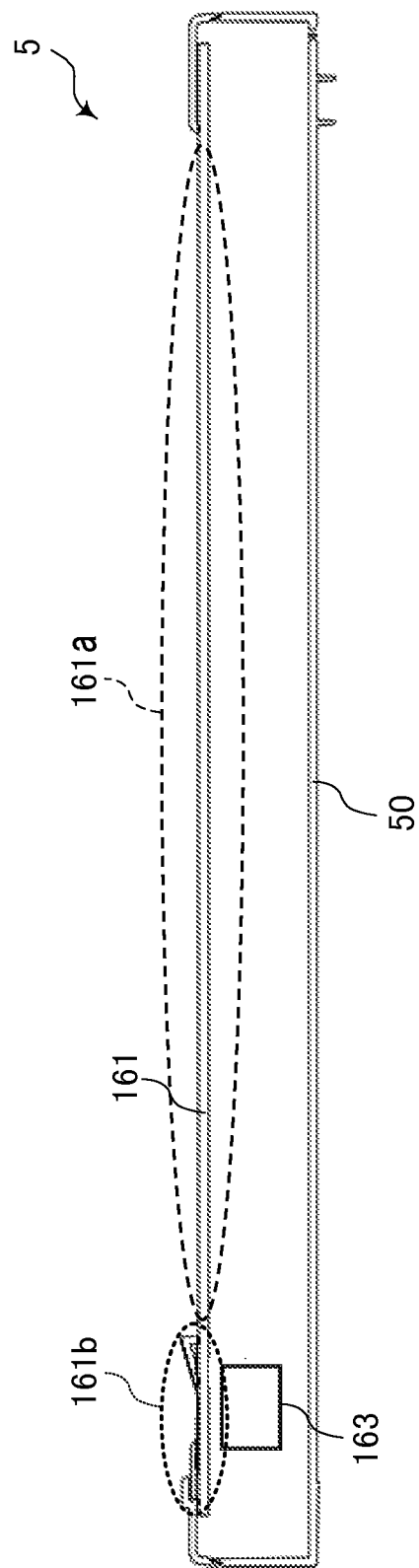
FIG. 2 is an elevation sectional view showing a structure of a document reading section.

FIG. 2 is an elevation sectional view showing a structure of the document reading device 5. One piece of contact glass 161 fitted to the opening on the top surface of the image reading section housing 50 is divided into two regions in a sub-scanning direction (horizontal direction in the figure) of the image reading section 163, and the wider region corresponds to a fixed document reading region 161a and the narrower region corresponds to a conveyed document reading region 161b. To read the image of the document loaded in the fixed document reading region 161a of the contact glass 161, the document reading device 5 moves the image reading section 163 in the sub-scanning direction below the fixed document reading region 161a to scan this document. On the other hand, to read the image of the document conveyed from the document conveyance section 6 to the conveyed document reading region 161b of the contact glass 161, as shown in FIG. 2, fixes the image reading section 163 at a predefined reading position (image reading position) below the conveyed document reading region 161b to scan this document.

Figure 3:
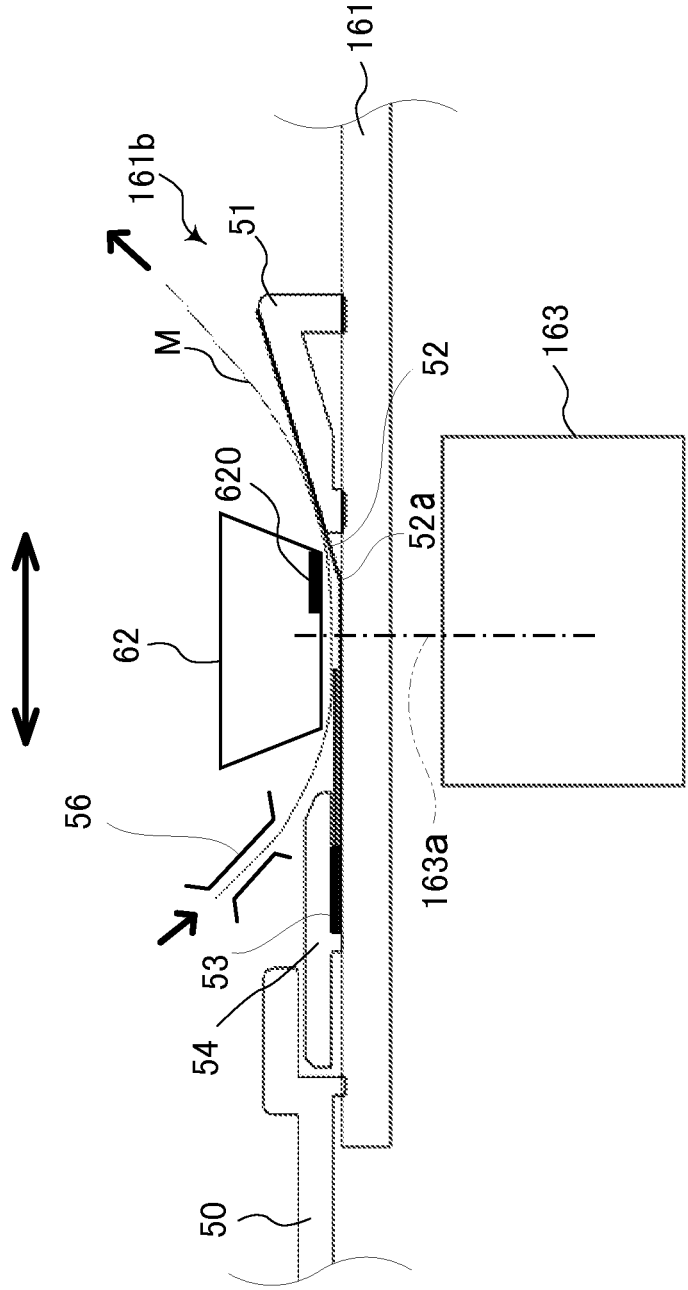
FIG. 3 is an enlarged sectional view showing a structure of a conveyed document reading region.

FIG. 3 is an enlarged sectional view showing a structure of the conveyed document reading region 161b. At time of the conveyed document reading, a document M is conveyed in the conveyed document reading region 161b in a direction of an arrow in the figure. The image reading section 163, at an image reading position 163a, superposes a transparent reading sheet 52 onto the contact glass 161 to read an image of the document M.

Disposed upstream of the image reading position 163a in a document conveyance direction is a document installation guide 56. The document installation guide 56 guides the document conveyed by the document conveyance section 6 to an area between the conveyed document reading region 161b and a reading guide (platen member) 62 provided thereabove.

Arranged downstream of the image reading position 163a in the document conveyance direction is a document discharge guide 51 of a wedge shape in cross section which becomes thicker along the document conveyance direction. The document discharge guide 51 is arranged downstream, in the document conveyance direction, of the aforementioned image reading position where the document M guided by the document installation guide 56 is read by the image reading section 163 in the conveyed document reading region 16b, and guides the document M in a direction separating it from a portion of the contact glass 161 as the conveyed document reading region 161b.

The transparent reading sheet 52 is attached to a sheet holder 54, and is detachably fitted to the image reading section housing 50. For a downstream side of the transparent reading sheet 52 in the document conveyance direction, formed on downstream of the image reading position 163a is a folding section 52a, which is attached along the document discharge guide 51. Providing the transparent reading sheet 52 with the folding section 52a in this manner permits installation of the transparent reading sheet 52 while avoiding it from lifting up from the contact glass 161.

Arranged upstream of the image reading position 163a in the document conveyance direction is a conveyance guide sheet 53. The conveyance guide sheet 53 is attached to the sheet holder 54 and superposed on the transparent reading sheet 52. This configuration permits contact of the document M at two areas, i.e., the conveyance guide sheet 53 and a side downstream of the folding section 52a of the transparent reading sheet 52 in the conveyance direction. Reading of an image of the document M is performed between a downstream end of the conveyance guide sheet 53 in the document conveyance direction and the folding section 52a of the transparent reading sheet 52. This configuration avoids direct contact (excluding a tip edge and a rear edge of the document M) with a document paper passage surface side of the transparent reading sheet 52 at the image reading position 163a, which can reduce formation of a scratch on the transparent reading sheet 52 as a result of document passage.

Specifically, the transparent reading sheet 52 is so provided as to link between a surface of the portion of the contact glass 161 as the conveyed document reading region 161b and a surface of the document discharge guide 51. With this transparent reading sheet 52, the document M is smoothly conveyed to the image reading position 163a and discharged from the image reading position 163a.

When the contact glass 161 and the transparent reading sheet 52 are superposed on each other, a small air layer is formed between the contact glass 161 and the transparent reading sheet 52, whereby reflective light at a boundary between the contact glass 161 and the transparent reading sheet 52 interferes with reflective light at a boundary between the air layer and the transparent reading sheet 52, causing an interference stripe pattern, which leads to a risk of deteriorated image reading performance. Therefore, it is desirable that a sheet subjected to reflection prevention processing by way of coating be used on a surface side of the transparent reading sheet 52 in contact with the contact glass. This consequently suppresses light reflection on the surface side of the transparent reading sheet 52 in contact with the contact glass, hardly causing light interference, whereby the image reading performance can be kept favorably.

At the image reading position 163a, a reading guide (platen member) 62 is arranged in a manner such as to oppose the conveyed document reading region 161b. The reading guide 62 is one component member of the document conveyance section 6, and is arranged at a position shown in FIG. 3 by closing the document conveyance section 6 in a manner such as to cover the top surface of the document reading device 5 to form a document conveyance path, regulating floating and conveyance of the document M.

Provided at part of a surface in the reading guide 62 opposing the conveyed document reading region 161b is a black reference member 620. The black reference member 620 is optically read by the image reading section 163 for the purpose of correcting black reference data of an image of the document M conveyed by the document conveyance section 6 and read by the document reading device 5, and can be provided by printing or painting of the reading guide 62 and further attaching a long member of a black-colored resin material or paper. As a result of irradiating light to the black reference member 620 through the contact glass 161 and the transparent reading sheet 52 and receiving its reflective light by the image reading section 163 to thereby acquire correcting black data in accordance with a degree of the scratch on the transparent reading sheet 52, which permits correction of the black reference data based on this correcting black data.

It is desirable that the black reference member 620 extend over a reading region in a direction of main scanning by the image reading section 163. Moreover, it is desirable that the image reading section 163 be arranged at a position different from that of the image reading position 163a in the sub-scanning direction. In other words, to favorably keep reading gradation of the image of the document M, it is desirable that a portion of the surface opposing the conveyed document reading region 161b in the reading guide 62 which portion corresponds to the image reading position 163a be white. Consequently, as a result of receiving reflective light of light irradiated by the image reading section 163 to this white portion of the reading guide 62, the image reading section 163 can acquire correcting white data used for shading correction for the purpose of maintaining an amount of irradiated light constant and use it for data light volume correction, and can also move the black reference member 620 downward to acquire the correcting black data.

In a given range on upstream and downstream sides in the document conveyance direction in the transparent reading sheet 52 with the image reading section 163 as a center, a linear scratch is formed in the document conveyance direction and thus the same scratch is formed at a portion immediately below the black reference member 620 of the transparent reading sheet 52. Therefore, in a case where the black reference member 620 is arranged at a position shifted from the image reading position 163a, the image reading section 163 can be moved to an area immediately below the black reference member 620 and a black color of the black reference member 620 can be read, whereby the correcting black data whose concentration is influenced by the scratch on the transparent reading sheet 52 can be acquired and this can be used to correct the black reference data used for shading correction.

The transparent reading sheet 52 is attached to the sheet holder 54, and is detachably fitted to the image reading section housing 50. On the downstream side of the transparent reading sheet 52 in the document conveyance direction, the folding section 52a is formed, which is attached along the document discharge guide 51. Providing the folding section 52a at the transparent reading sheet 52 in this manner permits installation of the transparent reading sheet 52 without its floating from the contact glass 161.

Thus, the black reference member 620 is arranged on a surface of the reading guide 62 located downstream of the image reading position 163a in the document conveyance direction and at a position opposing the transparent reading sheet 52. This permits acquisition of correcting black data on which a concentration effect by the scratch on the transparent reading sheet 52 is more accurately reflected.

Figure 4:
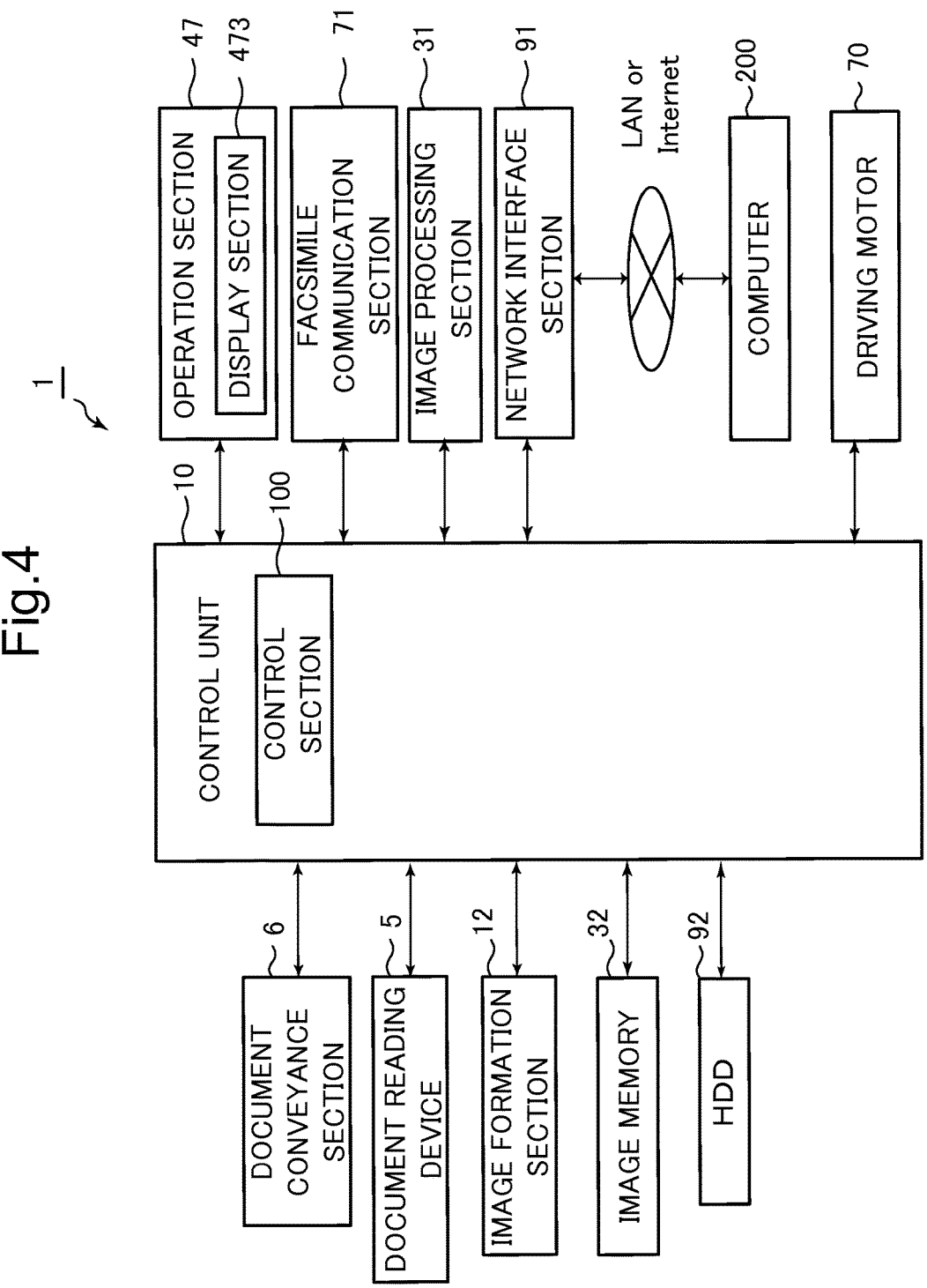
FIG. 4 is a functional block diagram schematically showing main inner configuration of the image forming apparatus.

FIG. 4 is a functional block diagram showing main inner configuration of the image forming apparatus 1. The image forming apparatus 1 includes: a control unit 10, the operation section 47, the document conveyance section 6, the document reading device 5, an image memory 32, the image formation section 12, a driving motor 70, a facsimile communication section 71, a network interface section 91, an HDD, etc.

The control unit 10 is composed of: a central processing unit (CPU), a RAM, a ROM, a desiccated hardware circuit etc., and is in charge of overall operation control of the image forming apparatus 1. The control unit 10 includes a control section 100. The control section 100 is connected to the document reading device 5, the document conveyance section 6, an image processing section 31, the image memory 32, the image formation section 12, the operation section 47, the facsimile communication section 71, the network interface section 91, the hard disc drive (HDD) 92, etc., and in charge of driving control of these sections.

The document reading device 5, under control by the control unit 10, has the aforementioned image reading section 163 having a CCD sensor, an exposure lamp etc. The document reading device 5 irradiates the document by use of the exposure lamp and receives reflective light thereof with the CCD sensor to thereby read an image from the document.

The image processing section (one example of the black reference correction section) 31 performs image processing on the image data of the image read by the document reading device 5. For example, the image processing section 31 corrects the black reference data by use of the correcting black data acquired through reading of the black reference member 620 by the image reading section 163. Moreover, the image processing section 31, in order to improve quality of the image read by the document reading device 5 after image-formed by the image formation section 12, by using the corrected black reference data, performs predefined image processing such as the shading correction of the image of the document read on the contact glass 161.

The image memory 32 is a region which temporarily stores data of the document image obtained through reading by the document reading device 5, and which temporarily saves data to be printed at the image formation section 12.

The image formation section 12 performs image formation of print data read at the document reading device 5, print data received from the network-connected computer 200, etc.

The operation section 47 receives, from the operator, instructions for various kinds of operation and processing executable by the image forming apparatus 1. The operation section 47 includes the display section 473.

The facsimile communication section 71 includes: an encoding-decoding section, a modulation and demodulation section, and a network control unit (NCU), all not shown, and performs facsimile transmission by use of a public phone line network.

The network interface section 91 is composed of a communication module such as a LAN board, and performs transmission and reception of various pieces of data to and from, for example, the computer 200 in a local area via, for example, the LAN connected to this network interface section 91.

The HDD 92 is a large-capacity storage device which stores, for example, the document image read by the document reading device 5.

The driving motor 70 is a driving source which provides a rotational driving force to various rotary members of the image formation section 12, for example, the photoconductive drum 121 and various rotary members of the fixing section 13.

Next, the black reference data correction in document reading will be described. FIG. 5 is a flowchart of the black reference data correction in the document reading.

First, when power of the image forming apparatus 1 has been turned on, power of the document reading device 5 is automatically turned on synchronously therewith (S1). Upon the turn-on of the power of the document reading device 5, the control section 100 controls the document reading device 5 and performs image reading operation while a light source of the image reading section 163 is off to acquire black reference data Bt for fixed document reading (S2). The control section 100 multiplies the black reference data Bt for the fixed document reading by a predefined coefficient k (a correction coefficient for conversion of the black reference data Bt for the fixed document reading into black reference data for conveyed document reading) to calculate black reference data Bd0 for the conveyed document reading (S3). That is, Bd0=k*Bt.

Further, the control section 100 controls the document reading device 5, moves the image reading section 163 to a position immediately below the black reference member 620, while a light source is on, performs image reading operation to acquire initial correcting black data Bd1 of the black reference member 620 (S3). For example, the correcting black data Bd1 is stored into, for example, a memory, not shown, in the control unit 10.

Then the control section 100 initializes a parameter i at 0 (S4).

The control section 100 monitors whether or not there is a document reading request from the user (S5), and upon detection of the document reading request (YES in S5), determines whether or not this request is for the conveyed document reading. If the document reading request is for the fixed document reading (No in S6), the control section 100 controls the document reading device 5 and executes reading of an image of the document loaded in the fixed document reading region 161a of the contact glass 161 (S7). In the fixed document reading, the image processing section 31, based on the black reference data Bt for the fixed document reading, performs shading correction on the image of the document read by the document reading device 20. Upon end of the requested fixed document reading, the processing returns to step S5.

On the other hand, if the document reading request is for the conveyed document reading (YES in S6), the control section 100 determines whether or not it is the first conveyed document reading after the power of the document reading device 5 is turned on. More specifically, the control section 100 increments the parameter i (S8), and determines whether or not i is equal to 1 (S9) to thereby determine whether or not it is the first conveyed document reading after the power of the document reading device 5 is turned on.

If it is the first conveyed document reading after the power of the document reading device 5 is turned on (that is, i=1, Yes in S9), the control section 100 controls the document reading device 5, moves the image reading section 163 to the position immediately below the black reference member 620, and while the light source is on, performs image reading operation to thereby acquire correcting black data Bd2 of the black reference member 620 (S10). Then the control section 100 calculates black reference data Bd for the conveyed document reading based on the acquired correcting black data Bd2 (S11). The black reference data Bd for the conveyed document reading can be calculated by, for example, formula below:

$$Bd=Bd0*(Bd2/Bd1).$$

The correcting black data Bd1, as shown in S3, is the correcting black data acquired by performing the image reading operation of the black reference member 620 while the light source of the image reading section 163 is on at an initial operation start of the document reading device 20. The correcting black data Bd1 is read from the memory described above when necessary.

Upon end of the calculation of the black reference data Bd for the conveyed document reading, the control section 100 controls the document reading device 5 and the document conveyance section 6, and individually conveys the documents to the conveyed document reading region 161b of the contact glass 161 to execute image reading of each document (S12). In the conveyed document reading, the image processing section 31 uses the black reference data Bd for the conveyed document reading to perform shading correction on the image of the document read by the document reading device 20 (S13). That is, the image processing section 31, as a black reference correction section, corrects the prior black reference data to the new black reference data Bd obtained by use of the correcting black data Bd2 acquired in S10, and then performs the shading correction on the image of the document read by the document reading device 20. Upon the end of the requested conveyed document reading, the processing returns to step S5. Note that the image processing section 31 also performs data light volume correction by use of white reference data calculated based on correcting white data obtained by receiving reflective light of light irradiated by the image reading section 163 to a white portion of the reading guide 62 while the document M is absent at, for example, the initial operation start of the document reading device 20.

On the other hand, if it is not the first conveyed document reading after the power of the document reading device 5 is turned on (NO in S9), the control section 100 does not perform recalculation of the black reference data Bd for the conveyed document reading and holds the black reference data Bd for the conveyed document reading already calculated in S11, and controls the document reading device 5 and the document conveyance section 6 and individually conveys the documents to the conveyed document reading region 161b of the contact glass 161 to execute reading of an image of each document (S12).

According to this embodiment as described above, in the document reading device 20 which performs document reading via the transparent reading sheet 52 at time of the conveyed document reading, even in a case where a small scratch is formed on the surface of the transparent reading sheet 52 as a result of document passage, the image concentration can be corrected and kept favorably.

Note that the invention is not limited to the configuration of the embodiment described above, and various modifications can be made thereto. For example, the fixed document reading region 161*a* and the conveyed document reading region 161*b* are formed of one piece of contact glass 161 in the document reading device 5, but these reading sections may be respectively formed of two pieces of contact glass. Moreover, for example, in the embodiment described above, as one embodiment of the image forming apparatus according to the invention, the multifunction peripheral is used for the description, but this is just one example, and it may be another image forming apparatus such as, for example, a printer, a copier, or a facsimile device.

The scratch formed on the transparent reading sheet 52 as a result of the document passage is a small scratch of approximately several microns to several tens of microns depending on the document, and thus a change in the image concentration in one conveyed document reading is gradual. Therefore, correction of the black reference data for the conveyed document reading does not have to be performed frequently. Moreover, the scratch once formed is not smoothed, and thus there is no need of returning correction results of the black reference data for the conveyed document reading to original ones. In the flowchart of FIG. 5, after an instruction for the conveyed document reading is first given after the power of the document reading device 20 is turned on, the black reference data for the conveyed document reading is corrected immediately before the conveyed document reading, but instead, the black reference data for the conveyed document reading may be corrected every time a number of documents conveyed by the document conveyance section 6 reaches a predefined value (for example, 1000 pieces). This can consequently reduce frequency in which the correction of the black reference data for the conveyed document reading is carried out, which can suppress performance deterioration in the conveyed document reading operation attributable to execution of the correction of the black reference data for the conveyed document reading.

Moreover, in the embodiment described above, the configuration and processing shown by the embodiment described above with reference to FIGS. 1 through 5 are just one embodiment of the invention, and it is not intended to limit the invention to the configuration and processing.

The invention claimed is:

1. A document reading device comprising:
    a document conveyance section including a plurality of rollers and individually conveying loaded documents as a result of driving of the rollers;
    an image reading section including an image sensor and optically reading each of the documents by using the image sensor, the image reading section moving in a predefined direction at below a fixed document reading region so as to read an image of the document loaded in a fixed document reading region, the fixed document reading region being one portion of a contact glass, and stopping at a reading position lower than a conveyed document reading region so as to read an image of the document conveyed by the document conveyance section to the conveyed document reading region, the conveyed document reading region being another portion of the contact glass;
    a document installation guide guiding the document conveyed by the document conveyance section to an area between the conveyed document reading region and a platen member provided above the conveyed document reading region;
    a document discharge guide being arranged downstream, in a document conveyance direction, of the reading position where the document guided by the document installation guide is read by the image reading section in the conveyed document reading region, the document discharge guide guiding the document in a direction separating the document from a portion of the contact glass as the conveyed document reading region;
    a transparent reading sheet having a folding section that is folded from a surface of the portion of the contact glass toward the document discharge guide and is provided downstream of the reading position in the document conveyance direction, the transparent reading sheet being provided in a manner such as to link between a surface of the portion of the contact glass as the conveyed document reading region and a surface of the document discharge guide;
    a conveyance guide sheet being provided, while superposed on a document passage surface of the transparent reading sheet, at a position upstream of the reading position in the document conveyance direction in the contact glass;
    a black reference member of a black color being arranged at a position opposing the transparent reading sheet with a document conveyance path in between and at part of a surface of the platen member opposing the conveyed document reading region, the document conveyance path being a passage where the document conveyed to the document conveyance section passes, the black reference member extending in a main-scanning direction of the image reading section and arranged downstream of the reading position in the document conveyance direction and above the folding section;
    an image processing section correcting black reference data used for shading correction of the document image acquired through the reading by the image reading section in the conveyed document reading region by using correcting black data obtained through reading of the black reference member plate by the image reading section via the transparent reading sheet and the contact glass, and performing the shading correction on the document image acquired by the image reading section in the conveyed document reading region by using the corrected black reference data; and
    a control section controlling an image reading operation performed by the image reading section, wherein
    the black reference member, the document conveyance path, the transparent reading sheet, and the image reading section which is stopping at the reading position are arranged so as to be aligned in this order downward from above,
    the reading position is, in the document conveyance direction, a position between a downstream end of the conveyance guide sheet in the document conveyance direction and the folding section of the transparent reading sheet,
    the conveyance guide sheet and the portion downstream of the folding section of the transparent reading sheet in the document conveyance direction are provided at a position where the document conveyed by the document conveyance section comes into contact therewith from below, (i) after power of the document reading device is turned on, the control section: (i-i) acquires, while a light source of the image reading section is off, black reference data (Bt) for fixed document reading by allowing the document reading device to perform the image reading; (i-ii) multiplies the black reference data (Bt) for the fixed document reading by a predefined coefficient (k) and calculates initial black reference data (Bd0) for the conveyed document reading; and (i-iii) acquires, while the light source of the image reading section is on and before a first scanning is performed, initial correcting black data (Bd1) of the black reference member by controlling the document reading device to read the black reference member through the contact glass and the transparent reading sheet, the first scanning being an initial scanning after the power is tuned on, (ii) after the acquisition of the initial correcting black data (Bd1) and when the conveyed document reading that is performed in accordance with a request for the conveyed document reading is performed, every time a number of documents conveyed by the document conveyance section reaches a predefined number, the control section acquires correcting black data (Bd2) of the black reference member by allowing the document reading device to perform the image reading at a position below the black reference member while the light source of the image reading section is on, and by allowing the document reading device to receive light having passed through the contact glass and the transparent reading sheet and reflected at the black reference member, the correcting black data (Bd2) being influenced by a scratch that is formed on the transparent reading sheet, the scratch being caused by the document conveyed to the document conveyance section when the document goes through a process of passing the document conveyance path, and the image processing section calculates black reference data (Bd) for the conveyed document reading by correcting the initial black reference data (Bd0) for the conveyed document reading calculated after the turn-on of the power in accordance with difference between the correcting black data (Bd2) and the initial correcting black data (Bd1), the black reference data (Bd) for the conveyed document reading being used for performing the shading correction on the document image acquired through the reading by the image reading section.

2. The document reading device according to claim 1, wherein reflection prevention processing is performed on a surface side of the transparent reading sheet in contact with the contact glass.

3. The document reading device according to claim 1, further comprises a sheet holder fixing upstream ends of the transparent reading sheet and the conveyance guide sheet in the document conveyance direction.

4. An image forming apparatus comprising:
a document reading device including;
a document conveyance section including a plurality of rollers and individually conveying loaded documents as a result of driving of the rollers;
an image reading section including an image sensor and optically reading each of the documents by using the image sensor, the image reading section moving in a predefined direction at below a fixed document reading region so as to read an image of the document loaded in a fixed document reading region, the fixed document reading region being one portion of a contact glass, and stopping at a reading position lower than a conveyed document reading region so as to read an image of the document conveyed by the document conveyance section to the conveyed document reading region, the conveyed document reading region being another portion of the contact glass;
a document installation guide guiding the document conveyed by the document conveyance section to an area between the conveyed document reading region and a platen member provided above the conveyed document reading region;
a document discharge guide being arranged downstream, in a document conveyance direction, of the reading position where the document guided by the document installation guide is read by the image reading section in the conveyed document reading region, the document discharge guide guiding the document in a direction separating the document from a portion of the contact glass as the conveyed document reading region;
a transparent reading sheet having a folding section that is folded from a surface of the portion of the contact glass toward the document discharge guide and is provided downstream of the reading position in the document conveyance direction, the transparent reading sheet being provided in a manner such as to link between a surface of the portion of the contact glass as the conveyed document reading region and a surface of the document discharge guide;
a conveyance guide sheet being provided, while superposed on a document passage surface of the transparent reading sheet, at a position upstream of the reading position in the document conveyance direction in the contact glass;
a black reference member of a black color being arranged at a position opposing the transparent reading sheet with a document conveyance path in between and at part of a surface of the platen member opposing the conveyed document reading region, the document conveyance path being a passage where the document conveyed to the document conveyance section passes, the black reference member extending in a main-scanning direction of the image reading section and arranged downstream of the reading position in the document conveyance direction and above the folding section;
an image processing section including a processor and as a result of a processing operation by the processor, correcting black reference data used for shading correction of the document image acquired through the reading by the image reading section in the conveyed document reading region by using correcting black data obtained through reading of the black reference member plate by the image reading section via the transparent reading sheet and the contact glass, and performing the shading correction on the document image acquired by the image reading section in the conveyed document reading region by using the corrected black reference data; and
a control section controlling an image reading operation performed by the image reading section,
an image formation section including a developing device, a charging device, and an exposure device, and with processes of charging, exposure, and developing performed by the developing device, the charging device, and the exposure device, forming a toner image on recording paper based on the image subjected to the shading correction performed by the image processing section; and a fixing section including a roller, and fixing the toner image onto the recording paper through thermal compression performed by the roller, wherein the black reference member, the document conveyance path, the transparent reading sheet, and the image reading section which is stopping at the reading position are arranged so as to be aligned in this order downward from above, the reading position is, in the document conveyance direction, a position between a downstream end of the conveyance guide sheet in the document conveyance direction and the folding section of the transparent reading sheet, the conveyance guide sheet and the portion downstream of the folding section of the transparent reading sheet in the document conveyance direction are provided at a position where the document conveyed by the document conveyance section comes into contact therewith from below, (i) after power of the document reading device is turned on, the control section: (i-i) acquires, while a light source of the image reading section is off, black reference data (Bt) for fixed document reading by allowing the document reading device to perform the image reading; (i-ii) multiplies the black reference data (Bt) for the fixed document reading by a predefined coefficient (k) and calculates initial black reference data (Bd0) for the conveyed document reading; and (i-iii) acquires, while the light source of the image reading section is on, initial correcting black data (Bd1) of the black reference member by controlling the document reading device to read the black reference member, (ii) after the acquisition of the initial correcting black data (Bd1) and when the conveyed document reading that is performed in accordance with a request for the conveyed document reading is performed, every time a number of documents conveyed by the document conveyance section reaches a predefined number, the control section acquires correcting black data (Bd2) of the black reference member by allowing the document reading device to receive light having passed through the contact glass and the transparent reading sheet and reflected at the black reference member, the correcting black data (Bd2) being influenced by a scratch that is formed on the transparent reading sheet, the scratch being caused by the document conveyed to the document conveyance section when the document goes through a process of passing the document conveyance path, and the image processing section calculates black reference data (Bd) for the conveyed document reading by correcting the initial black reference data (Bd0) for the conveyed document reading calculated after the turn-on of the power in accordance with difference between the correcting black data (Bd2) and the initial correcting black data (Bd1), and the image processing section performs the shading correction on the document image acquired through the reading by the image reading section by using the black reference data (Bd).

* * * * *